(12) United States Patent
Eastment et al.

(10) Patent No.: US 7,586,637 B2
(45) Date of Patent: Sep. 8, 2009

(54) POWER MANAGEMENT IN A PRINTER SYSTEM

(75) Inventors: Joanna Jean Eastment, Brighton, CO (US); Joshua Ruben Engel, Longmont, CO (US); Stephen Dale Hanna, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 733 days.

(21) Appl. No.: 10/880,237

(22) Filed: Jun. 28, 2004

(65) Prior Publication Data

US 2005/0286069 A1 Dec. 29, 2005

(51) Int. Cl.
- G06K 15/00 (2006.01)
- G06F 1/00 (2006.01)
- G06F 1/26 (2006.01)
- G03G 15/00 (2006.01)

(52) U.S. Cl. ............. 358/1.16; 713/300; 713/320; 399/88

(58) Field of Classification Search ............... None
See application file for complete search history.

(56) References Cited

U.S. PATENT DOCUMENTS

| | | | |
|---|---|---|---|
| 5,359,540 A | 10/1994 | Ortiz | |
| 5,666,539 A | 9/1997 | Kenkel | |
| 5,729,169 A * | 3/1998 | Roohparvar | 327/227 |
| 5,751,925 A * | 5/1998 | Kataoka et al. | 358/1.16 |
| 5,919,263 A | 7/1999 | Kikinis et al. | |
| 6,446,192 B1 | 9/2002 | Narasimhan et al. | |
| 6,473,810 B1 * | 10/2002 | Patel et al. | 710/7 |
| 2002/0131082 A1 | 9/2002 | Al-Varez-Baron Stoo | |
| 2002/0178387 A1 | 11/2002 | Theron | |

FOREIGN PATENT DOCUMENTS

| | | |
|---|---|---|
| JP | 2000-214961 | 8/2000 |
| JP | 2003-076447 | 3/2003 |

OTHER PUBLICATIONS

IBM Corporation, Power Saving Architecture for Point of Sale Terminal, IBM Technical Disclosure Bulletin, vol. 38, No. 03, Mar. 1995.

* cited by examiner

Primary Examiner—Twyler L Haskins
Assistant Examiner—Barbara D Reinier
(74) Attorney, Agent, or Firm—Duft Bornsen & Fishman, LLP

(57) ABSTRACT

A printer system includes a printer engine that produces an engine power status signal and a printer controller that produces a controller power status signal. A power management interface receives the engine power status signal and the controller power status signal and alters the power status of the printer controller by generating a power management signal based on the power status of the printer controller and the printer engine. The interface preferably alters the power status of the printer controller such that the power status of the printer controller tracks the power status of the engine. The interface may assert the power management signal in response to a transition in the engine power status signal and may format the power management signal according to an industry stand such as the PCI defined PME signal. The interface may be implemented as a board inserted in a PCI connector of the printer controller.

12 Claims, 3 Drawing Sheets

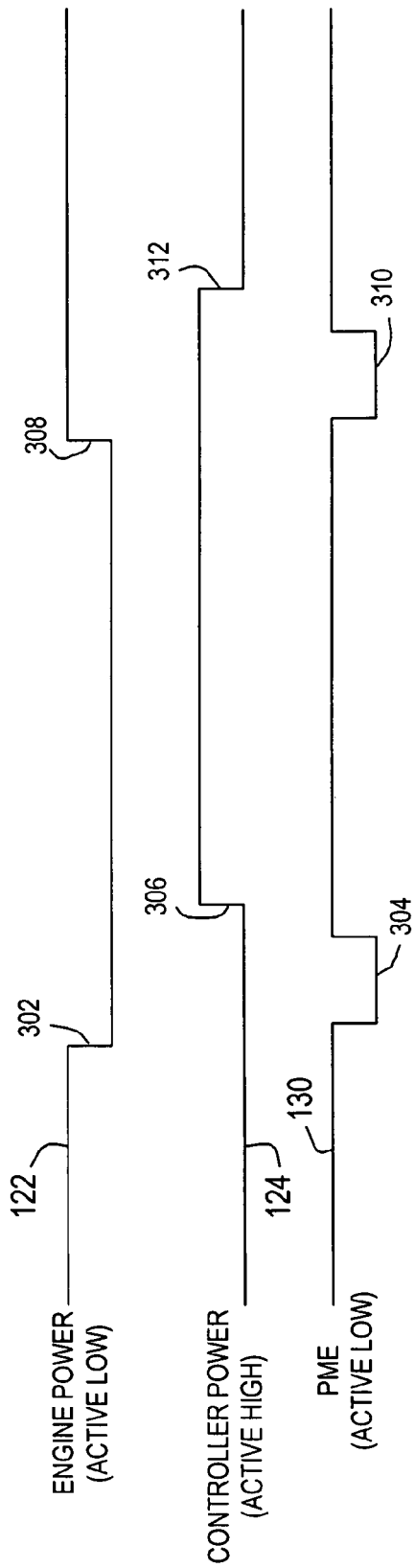
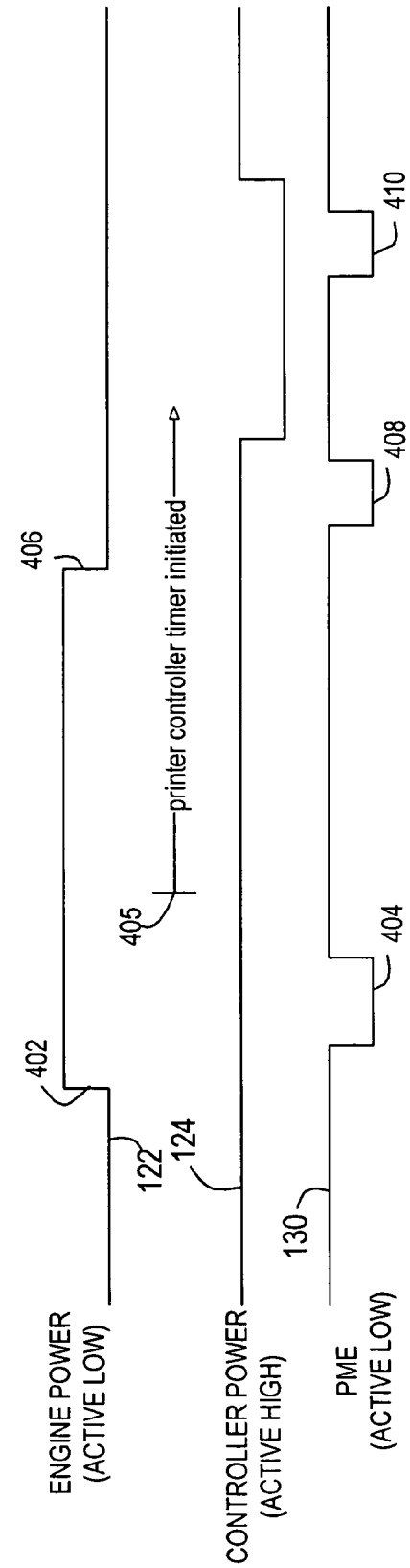

POWER MANAGEMENT IN A PRINTER SYSTEM

BACKGROUND

1. Field of the Present Invention

The present invention is in the field of printer systems and, more particularly printer systems that employ printer controllers.

2. History of Related Art

Production printer systems may include a controller that enables advanced printer control functionality. Exemplary of such printer systems are the Infoprint 2060ES and Infoprint 2090ES printers from IBM Corporation. In such systems, the controller provides functionality including printer-resident web pages that enable users to manage printer resources and submit print jobs, email printing and notification that allows users to send email, with attachments, to the printer, which can print directly from the email, scan functionality that enables users to scan documents directly to email or a fax, and other useful functions.

The controller in such printer systems is implemented with a printer circuit board or planar that has some of the characteristics of a desktop motherboard. Specifically, the printer controller includes a general purpose microprocessor such as a PowerPC microprocessor, a hard drive with significant disk space (e.g., 40 GB or more), system memory of 512 MB or more, and one or more network interconnect adapters.

It will be appreciated by those knowledgeable in the field of microprocessor-based systems generally that such a printer controller consumes significant power unless the controller is powered down or is in a low-power state. At the same time, many midrange production printer systems are designed for relatively moderate duty cycles and may be characterized by frequent periods of inactivity. It would be desirable to implement a printer system in which the power status of the printer system's "engine" is used to control the power state of the printer controller thereby powering down the printer controller when its function is not needed. Unfortunately, the printer engines in many printer systems are provided by third party vendors and the power state signals are not designed with printer controller communication in mind. It would be further desirable, therefore, if the implemented system were able to produce a printer controller power state signal in a format that is compatible with the power controller implementation.

SUMMARY OF THE INVENTION

The objectives identified above are addressed according to the present invention by a printer system which includes a printer engine that produces an engine power status signal and a printer controller that produces a controller power status signal. A power management interface receives the engine power status signal and the controller power status signal and alters the power status of the printer controller by generating a power management signal based on the power status of the printer controller and the printer engine. The interface preferably alters the power status of the printer controller such that the power status of the printer controller tracks the power status of the printer engine. The interface may assert the power management signal in response to a transition in the engine power status signal and may format the power management signal according to an industry standard such as the PCI defined PME signal. The interface may be implemented on a PCI board inserted in a PCI connector located on the printer controller. The power management interface may, as a backup measure, assert the power management signal if the printer controller is in a low power state a specified duration following an assertion of the power management signal that follows a transition of the engine power status signal responsive to the printer engine transitioning from an off state to an on state.

BRIEF DESCRIPTION OF THE DRAWINGS

Other objects and advantages of the invention will become apparent upon reading the following detailed description and upon reference to the accompanying drawings in which:

FIG. 3 is a timing diagram illustrating operation of an embodiment of the present invention;

FIG. 4 is a timing diagram illustrating operation of an embodiment of the present invention under alternative conditions;

Figure 1:
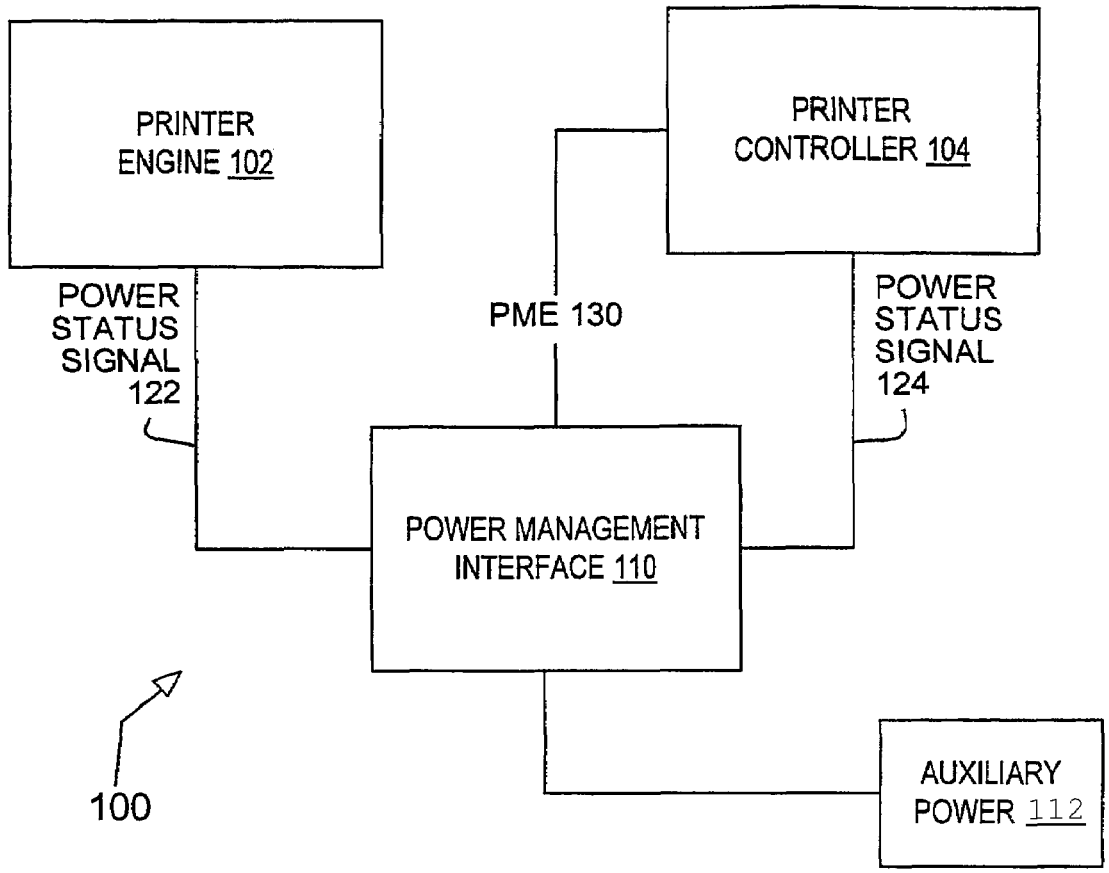
FIG. 1 is a block diagram of selected elements of a printer system according to an embodiment of the present invention.
Figure 2:
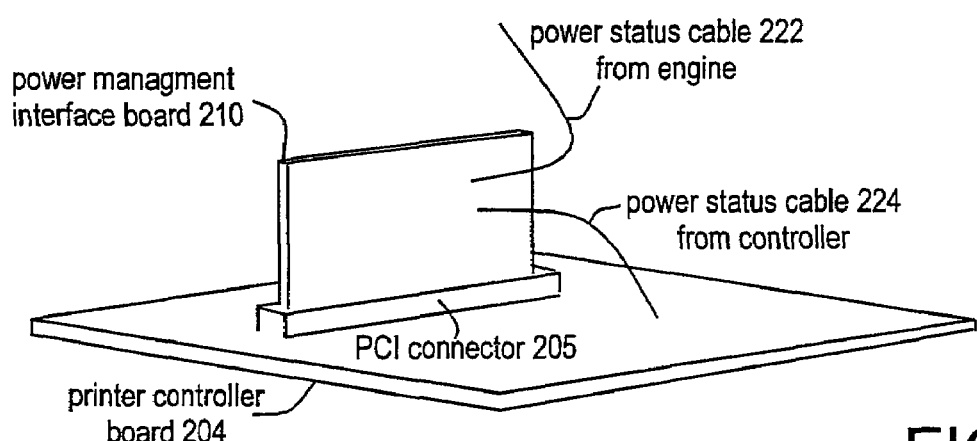
FIG. 2 is a perspective view of an implementation of elements of the printer system of FIG. 1.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a mechanism that enables power management within a printer system that includes a printer engine and a printer controller. Power signals from the engine and the controller are received as inputs. The inventive mechanism generates a power management signal that is suitable for altering the power state of the controller. In a conventional operation, the power management circuit produces a signal that powers up the controller following an off-to-on transition of the engine power and a signal that powers down the controller following an on-to-off transition of the engine power. In this manner, the power state of the controller is controlled by and mimics the power state of the engine. The power management signal is preferably generated by a circuit to which a constant source of power is provided so that circuit is functional independent of the power states of either the engine or the controller. In one embodiment, the power management control signal generated by the power management circuit is compatible with an industry standard power management event signal such as the PME signal defined in PCI 2.2.

Turning now to the drawings, FIG. 1 is a block diagram of selected elements of a printer system 100 according to one embodiment of the invention. In the depicted embodiment, printer system 100 includes a printer engine 102, a printer controller 104, and a power management interface 110. Printer engine 102 represents the electronic and mechanical components of printer system 100 that perform the actual printing of documents. Printer engine 102 determines, for example, the maximum throughput and the print resolution or quality of printer system 100. Printer engine 102 may be a self-contained and possibly field replaceable unit of printer system 100. Printer controller 104 is most likely implemented as one or more printed circuit boards contained within a chassis of printer system 100.

Printer engine 102, as depicted in FIG. 1 generates a power status (power state) signal 122 that is provided to power management interface 110. Similarly printer engine 104 generates a power status signal 124 that is provided to power management interface 110. Power management interface 110 receives the power state signals 122 and 124 and generates a power management signal (referred to herein as power management event or PME signal) 130. PME signal 130 is routed to printer controller 104.

In one embodiment, PME signal 130 connects to a PME pin of a PCI connector or interface of printer controller 104. Referring to FIG. 4, for example, an implementation of the present invention is shown as including a printer controller board 204 to which the elements of printer controller 104 such as a microprocessor, disk storage, and system memory (none of which are shown) are connected. Printer controller board 204 as shown includes a PCI connector 205 in which a power management interface board 210 is inserted. Power management interface board includes the elements of power management interface 110. A first cable 222 connects the power status signal 122 from printer engine 102 while a second cable 224 connects the power status signal 124 from printer controller 104. In this implementation, PME signal 130 may be provided to printer controller 104 via the PME signal of PCI connector 205. Revision 2.2 of the PCI Local Bus specification defines a power management event (PME) signal and the required format for this signal. In one implementation of the present invention, power management of printer controller 104 is provided via the PME signal of a PCI connector located on the power management board and into which a power management interface board 210 is located.

Referring now to FIG. 3 and FIG. 4, timing diagrams' are presented to illustrate the functionality provided by power management interface 110. The timing diagrams depict the engine power status signal 122, the controller power status signal 124, and the PME signal 130 as a function of time. For purposes of this illustration, it is presumed that the engine power status signal is a level-based signal that is active low and the controller power status signal is a level-based signal that is active high. In the implementation of FIG. 3, engine power status signal 122 and controller power status signal 124 are both in their inactive states indicating that printer engine 102 and printer controller 104 are both in an off state or low power state. Printer engine 102 then transitions (reference numeral 302) to an "on" state presumably in response to a user performing a function with printer system 100 (such as requesting print system 100 to print a document). Engine power state signal 122 transitions from high to low in response to the power on event of printer engine 102.

Power management interface 110 detects transition 302 of engine power status signal 122 (as well as the status of controller power status signal 124). In response to the combination of transition 302 and the inactive state of engine power status signal 124, power management interface 110 produces an active low pulse (304). The levels, transition times, pulse width, and polarity of the PME signal 130 as depicted in FIG. 3 are compliant with the PCI specification and, specifically, with the PCI specification description of the PCI PME signal.

The pulse 304 is provided to printer controller 104. Printer controller 104 is configured to respond to the power management signal by toggling its power state. Thus, the PME signal pulse 304 causes the controller power status signal 124 to transition (306) from an inactive state to an active state reflecting a transition of printer controller 104 from a powered down state to a powered on state.

Following transition 306, printer engine 102 and printer controller 104 are both in their active, powered states. If, printer engine 102 enters a powered down state through inactivity or a user powering off the engine, engine power status signal 122 transitions (308) from an active state to an inactive state. Power management interface 110 detects transition 308 state and, in response, generates a pulse 310 on PME signal 130 which is received by printer controller 104 and causes the controller to power off as reflected by the transition 312 of controller power status signal 124. In this manner, power management interface 110 provides a mechanism that enables printer engine 102 to control the power state of printer controller 104 even though printer engine 102 does not, itself, generate a power status signal that is compatible with (understood by) printer controller 104. Specifically, power management interface 110 provides a signal that causes the power state of printer controller 104 to track or follow the power state of printer engine 102 such that the power states of the engine and controller are synchronized (with the printer controller power transitioning a short time after the printer engine power transitions).

The timeline of FIG. 3 is indicative of the behavior of printer system 100 under normal operating conditions. In the event that printer controller 104 "hangs" or does not otherwise respond to PME signal 130, causing the two power status signals to become out of synchronization, additional consideration is required to synchronize the signals. Referring to FIG. 4, an illustration of a case when the two power status signals 122 and 124 are out of synchronization, is depicted. In the situation depicted in FIG. 4, engine power status signal 122 and controller power status signal 124 are initially active and in synchronization (i.e., both signals reflect powered on states of their respective systems). When engine power status signal 122 transitions (402) in response to printer engine 102 entering a low power state, power management interface 110 generates a pulse 404 on PME signal 130 that is received by printer controller 104. In this case, however, printer controller 104 fails to respond to pulse 404 by transitioning its power state. In one embodiment, printer controller 104 is designed to perform a "hard" power down under at least two circumstances. If, following a specified duration following a PME signal pulse, the printer controller power is still on, a hard power down is performed. Similarly, if a second PME signal pulse is received while printer controller 104 remains in the active power state, a hard shut down is performed. Normally, either of these two occurrences will restore the controller power status signal 124 to its powered down state and thereby restore the pair of power status signals to a synchronous state.

As depicted in FIG. 4, however, an unexpected event is encountered that disrupts the power state recovery mechanism described in the preceding paragraph. Specifically, FIG. 4 illustrates a case in which, because controller power status signal 124 did not toggle following assertion of pulse 404, the printer controller's timer is initiated (405). Before the timer expires, however, printer engine 102 enters an active power state (transition 406) thereby causing power interface 110 to generate a second pulse 408 of PME signal 130. Second pulse 408 causes a hard shut down of printer controller 104, resulting in a power mismatch between printer engine 102 and printer controller 104 (engine 102 is active while interface 110 is powered down). To correct the problem in the event of such an occurrence, power interface 110 is configured to generate a third pulse 410 that restores power to printer controller 104 and thereby synchronizes the power states of engine 102 and controller 104.

Figure 5:
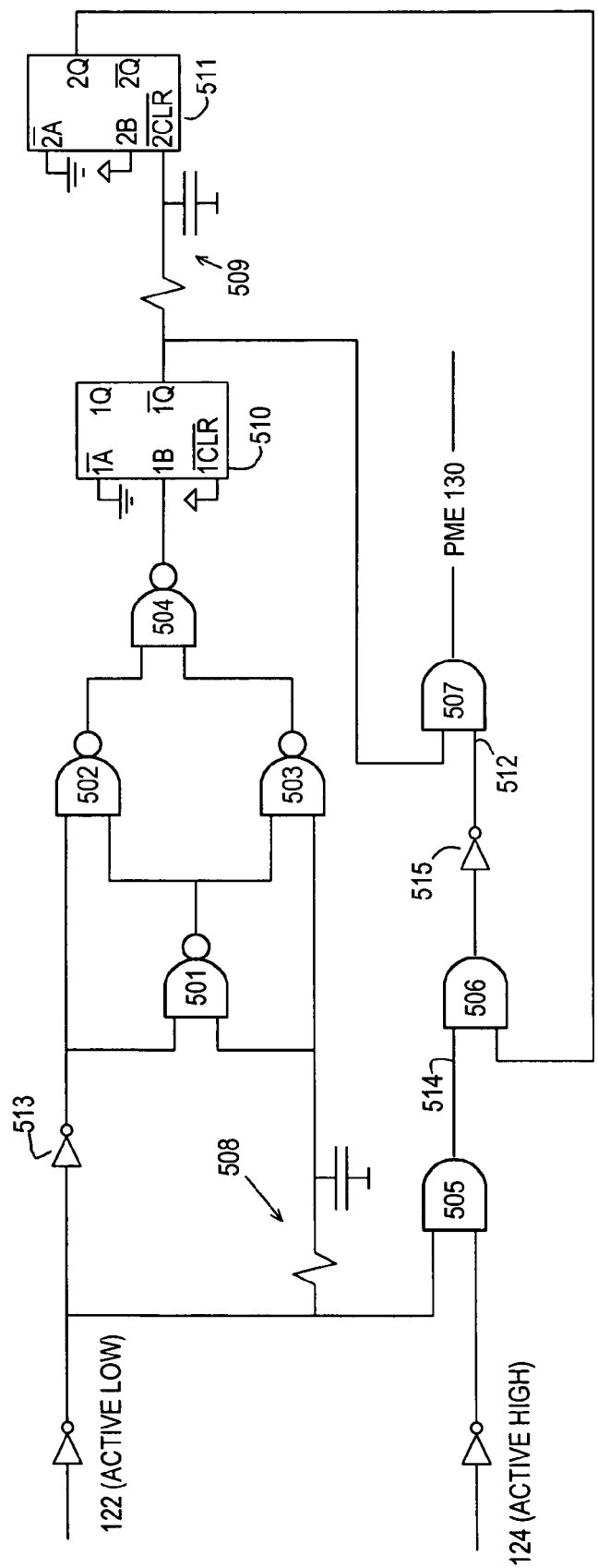
FIG. 5 is a circuit diagram of an implementation of the power management interface according to one embodiment of the invention.

Referring now to FIG. 5, a circuit diagram of one implementation of power interface 110 according to the present invention is shown. As depicted in FIG. 5, power interface 110 is implemented as a circuit 500 that receives the engine power status signal 122 as its first input and the controller power status signal 124 as its second input. Circuit 500 includes a pulse generating portion 520 driven by engine power status signal 122. Pulse generating portion 520 includes the inverter 513, RC circuit 508, and the NAND gates 501 through 504. The output of pulse generating portion 520 is normally high, but pulses low in response to a transition of engine power status signal 122. Pulse generating portion 520 provides the B input to one shot 510, which generates a negative going pulse output at its Q' terminal in response to a pulse at its B input. The Q' output of the one shot 510 is gated by AND gate 507 to generate PME signal 130. Under normal circumstances, input 512 of AND gate 507 is high such that PME signal 130 mirrors the Q' output of one shot 510.

The depicted embodiment of circuit 500 includes a second one shot 511 and a second RC circuit 509 at the Q' output of first one shot 510. The second one shot, in combination with RC circuit 509 produces a positive going pulse at the Q output of one shot 511 that is time delayed with respect to any pulse generated on the Q' output of one shot 510. The Q output of one shot 511 is provided to AND gate 506. Under normal circumstances, input 514 to AND gate 506 is low thereby effectively masking the output from one shot 511. If however, the controller power status signal 124 remains low (inactive) for a period (determined by the delay associated with RC circuit 509) after engine power status signal 102 transitions high, input 514 of AND gate 506 will be high thereby permitting the pulse from one shot 511 to be gated through to and inverted by inverter 515 and to PME signal 130 via AND gate 507. Thus, circuit 500 provides a "normal" PME pulse each time engine power status signal 122 changes state as well as providing a "backup" PME pulse to address situations when the first PME pulse does not have the effect of turning the controller power on after the engine power has been turned on.

It will be apparent to those skilled in the art having the benefit of this disclosure that the present invention contemplates a power management interface in a printer system. It is understood that the forms of the invention shown and described in the detailed description and the drawings are to be taken merely as presently preferred examples. It is intended that the following claims be interpreted broadly to embrace all the variations of the preferred embodiments disclosed.

What is claimed is:

1. A printer system comprising:
a printer engine configured to generate an engine power status signal indicative of a power state of the printer engine;
a printer controller having a processor, memory, and persistent storage, wherein the printer controller is configured to generate a controller power status signal indicative of a power state of the printer controller; and
a power management interface powered independently from the power state of the printer engine and the power state of the printer controller, wherein the power management interface is configured to receive the engine power status signal and the controller power status signal and further configured to alter the power state of the printer controller by generating a power management signal to:
power up the printer controller responsive to an off-to-on transition of the printer engine power state; and
power down the printer controller responsive to an on-to-off transition of the printer engine power state.

2. The printer system of claim 1, wherein the power management interface is further configured to format the power management signal as a PCI compliant power management event (PME) signal.

3. The printer system of claim 2, wherein the power management interface includes a printed circuit board inserted in a PCI connector of a printer controller printed circuit board.

4. A power management interface powered independently from a power state of a printer engine and a power state of a printer controller, wherein the power management interface comprises circuitry configured to receive an engine power status signal and a controller power status signal and circuitry configured to alter the power status of the printer controller by generating a power management signal to:
power up the printer controller responsive to an off-to-on transition of the printer engine power state; and
power down the printer controller responsive to an on-to-off transition of the printer engine power state.

5. The power management interface of claim 4, wherein the engine power status signal is a level oriented signal and wherein the power management signal is a pulsed signal.

6. The power management interface of claim 5, including a pulse generating circuit configured to produce a pulse responsive to a transition of the engine power status signal.

7. The power management interface of claim 6, wherein the pulse generated by the pulse generating circuit is provided to an input of a one shot circuit that produces a second pulse, wherein the output of the one shot circuit is gated by a logic gate that drives the power management signal.

8. The power management interface of claim 7, further comprising a second one shot circuit connected to an RC circuit between the first and second one shot circuits, wherein the output of the second one shot circuit produces a pulse that is delayed with respect to the pulse produced by the first one shot circuit.

9. The power management interface of claim 8, wherein the pulse generated by the second one shot circuit is gated to the power management signal output if the engine power status indicates that the engine power is on and the controller power status signal indicates that the controller power status is off.

10. A power management interface in a printer system powered independently of a power state of a printer engine and a power state of a printer controller, the power management interface comprising:
means for receiving an engine power status signal from the printer engine of the printer system, wherein the engine power status signal indicates the power state of the printer engine;
means for receiving a controller power status signal from a printer controller having a processor, memory, and persistent storage, wherein the controller power status signal indicates the power state of the printer controller; and
circuitry to alter the power state of the printer controller by generating a power management signal to:
power up the printer controller responsive to an off-to-on transition of the printer engine power state; and power down the printer controller responsive to an on-to-off transition of the printer engine power state.

11. The power management interface of claim 10, further configured to format the power management signal as a PCI compliant power management event (PME) signal.

12. The power management interface of claim 11, wherein the interface comprises a printed circuit board inserted in a PCI connector of a printer controller printed circuit board.

* * * * *